United States Patent
Hermes et al.

(10) Patent No.: US 10,072,762 B2
(45) Date of Patent: Sep. 11, 2018

(54) ADAPTER VALVE ASSEMBLY

(71) Applicant: Pentair Flow Technologies, LLC, Delavan, WI (US)

(72) Inventors: Jeff Hermes, Shoreview, MN (US); Colin Jaedike, Shoreview, MN (US)

(73) Assignee: Pentair Flow Technologie, LLC, Delavan, WI (US)

(*) Notice: Subject to any disclaimer, the term of this patent is extended or adjusted under 35 U.S.C. 154(b) by 374 days.

(21) Appl. No.: 14/493,139

(22) Filed: Sep. 22, 2014

(65) Prior Publication Data

US 2016/0084387 A1    Mar. 24, 2016

(51) Int. Cl.
| | |
|---|---|
| *B05B 1/16* | (2006.01) |
| *F16K 5/06* | (2006.01) |
| *F16L 55/07* | (2006.01) |
| *A01M 7/00* | (2006.01) |
| *A01C 23/04* | (2006.01) |

(52) U.S. Cl.
CPC .......... *F16K 5/0626* (2013.01); *A01C 23/047* (2013.01); *A01M 7/006* (2013.01); *A01M 7/0042* (2013.01); *B05B 1/1672* (2013.01); *F16L 55/07* (2013.01)

(58) Field of Classification Search
CPC .... F16K 5/0626; A01C 23/047; A01M 7/006; A01M 7/0053; A01M 7/0089; B05B 1/1672; F16L 55/07
USPC .... 239/124, 189, 170, 581.1, 600, 394, 169; 137/15.17, 15.18, 315.18, 315.21, 625.11, 137/625.22
See application file for complete search history.

(56) References Cited

U.S. PATENT DOCUMENTS

| | | | |
|---|---|---|---|
| 4,058,260 A | * | 11/1977 | Lestradet ............. B05B 1/1645 239/394 |
| 4,824,342 A | | 4/1989 | Buck |
| 4,830,589 A | | 5/1989 | Pareja |
| 5,022,831 A | | 6/1991 | Gerlach et al. |
| 5,074,767 A | | 12/1991 | Gerlach et al. |
| 5,232,052 A | | 8/1993 | Arvidson et al. |
| 5,313,548 A | | 5/1994 | Arvidson et al. |

(Continued)

FOREIGN PATENT DOCUMENTS

| | | |
|---|---|---|
| DE | 102008002739 A1 | 12/2009 |
| DE | 102010036437 A1 | 1/2012 |

(Continued)

OTHER PUBLICATIONS

European Patent Office, Extended European Search Report, Application No. 15194386.7, dated Mar. 7, 2016.

*Primary Examiner* — Steven J Ganey
(74) *Attorney, Agent, or Firm* — Quarles & Brady LLP

(57) ABSTRACT

Embodiments of the disclosure provide an adapter valve assembly and a method for installing an adapter valve assembly that allows for independent control of fluid flow at an individual nozzle assembly. The adapter valve assembly can include a ball valve that can be actuated by electricity to change its position. The adapter valve assembly can function independent of the pressure or flow within the system and can be actuated as desired by the user. The adapter valve assembly can also have internal threads which can connect with the existing external threads on nozzle assemblies already installed in the field. Therefore, the adapter valve assembly can be used for retrofit applications.

24 Claims, 16 Drawing Sheets

(56) References Cited

U.S. PATENT DOCUMENTS

| | | | |
|---|---|---|---|
| 5,402,569 A | 4/1995 | Maki et al. | |
| 5,494,112 A | 2/1996 | Arvidson et al. | |
| RE35,362 E | 10/1996 | Arvidson et al. | |
| 5,765,644 A | 6/1998 | Arvidson et al. | |
| 5,934,173 A | 8/1999 | Murphy et al. | |
| 5,944,055 A | 8/1999 | Dicky | |
| 6,085,586 A | 7/2000 | Arvidson et al. | |
| 6,116,855 A | 9/2000 | Maki | |
| 6,126,171 A | 10/2000 | Vensland | |
| 6,189,807 B1 | 2/2001 | Miller et al. | |
| 6,394,753 B1 | 5/2002 | Maki et al. | |
| 6,557,787 B2 | 5/2003 | Swan | |
| 6,623,245 B2 | 9/2003 | Meza et al. | |
| 6,712,293 B2 | 3/2004 | Swan | |
| 6,749,134 B2 * | 6/2004 | Arenson | A62C 31/03 239/394 |
| 6,766,863 B2 | 7/2004 | Arvidson et al. | |
| 6,886,639 B2 | 5/2005 | Arvidson et al. | |
| 7,083,392 B2 | 8/2006 | Meza et al. | |
| 7,163,163 B2 | 1/2007 | Waddelow | |
| 7,318,483 B2 | 1/2008 | Arvidson et al. | |
| 7,584,908 B2 | 9/2009 | Swan et al. | |
| 7,614,455 B2 | 11/2009 | Arvidson et al. | |
| 7,775,781 B2 | 8/2010 | Maki et al. | |
| 7,861,946 B2 | 1/2011 | Beeren | |
| 7,878,419 B2 | 2/2011 | Waddelow | |
| 7,878,766 B2 | 2/2011 | Meza et al. | |
| D642,132 S | 7/2011 | Brennan, III et al. | |
| D642,135 S | 7/2011 | Brennan, III et al. | |
| 7,980,490 B2 | 7/2011 | Waddelow et al. | |
| D643,377 S | 8/2011 | Brennan, III et al. | |
| 7,997,348 B2 | 8/2011 | Hosfield et al. | |
| 8,083,506 B2 | 12/2011 | Maki et al. | |
| 8,103,366 B2 | 1/2012 | Gamble et al. | |
| 8,157,510 B2 | 4/2012 | Bear et al. | |
| 8,297,369 B2 | 10/2012 | Gamble et al. | |
| 8,317,485 B2 | 11/2012 | Meza et al. | |
| 8,337,166 B2 | 12/2012 | Meza et al. | |
| 8,454,307 B2 | 6/2013 | Cottrell et al. | |
| 8,641,383 B2 | 2/2014 | Meza et al. | |
| 8,936,207 B2 | 1/2015 | Swan | |
| 9,091,261 B2 | 7/2015 | Bear et al. | |
| 9,109,590 B2 | 8/2015 | Meza et al. | |
| 9,140,398 B2 | 9/2015 | Lang et al. | |
| 2002/0190140 A1 | 12/2002 | Arenson et al. | |
| 2008/0236846 A1 | 10/2008 | Gamble et al. | |
| 2010/0065286 A1 | 3/2010 | Hosfield | |
| 2010/0275475 A1 | 11/2010 | Mohr | |
| 2011/0056710 A1 | 3/2011 | Gamble et al. | |
| 2012/0012345 A1 | 1/2012 | Gamble et al. | |
| 2012/0061107 A1 | 3/2012 | Hosfield et al. | |
| 2012/0111420 A1 * | 5/2012 | Bisio | F16K 27/067 137/15.18 |
| 2012/0163956 A1 | 6/2012 | Lang et al. | |
| 2012/0263574 A1 | 10/2012 | Goulet et al. | |
| 2015/0369407 A1 | 12/2015 | Lang et al. | |
| 2016/0084387 A1 | 3/2016 | Hermes et al. | |

FOREIGN PATENT DOCUMENTS

| | | |
|---|---|---|
| EP | 1469246 A1 | 10/2004 |
| EP | 1661627 A1 | 5/2006 |
| WO | 2008039540 A2 | 4/2008 |

* cited by examiner

ADAPTER VALVE ASSEMBLY

BACKGROUND

The objective of an agricultural crop spraying machine is to effectively distribute an agro-chemical spray over the largest area of crop in the least amount of time. The conventional design for such a machine is a wheeled base unit, be it trailed or self-propelled, which carries a tank, pump, and controls. The conventional design supplies the agro-chemical to the distribution booms or boom pipes extending from either side of the wheeled base unit, perpendicular to the direction of travel. The boom pipes support nozzle assemblies and deliver fluid to the nozzle assemblies to deliver the agro-chemical spray. The primary role of the nozzle assemblies is to provide a sealed connection between the pipe work of the boom pipe and the spray tips to allow the agrochemical to be distributed. This setup is referred to as a wet boom configuration.

Nozzle assemblies are distributed at regular, uniform intervals along the spray boom pipe. Each nozzle assembly has a turret to which spray tips can be coupled to the nozzle assembly to regulate the spray pattern and flow rate. The nozzle assemblies also position the spray tips at the correct angle with respect to the direction of travel. Each nozzle assembly has a turret to which the spray tips are coupled to regulate spray pattern and flow rate.

The control of the agro-chemical or fluid to the nozzle assemblies can be regulated by large section valves. The section valves regulate which group of nozzle assemblies receives fluid when desired by a user. When fluid is sent to the nozzle assemblies, a large section valve (such as a diaphragm check valve) opens with a low pressure increase in the fluid, allowing fluid to exit the nozzle assemblies through the spray tips. The nozzle assemblies are currently designed so that fluid flow to an individual nozzle assembly is shut off if a large section valve upstream of that individual nozzle assembly is closed. However, once a large section valve is closed, fluid flow is closed to not only the first nozzle assembly downstream of the large section valve, but also to each and every other nozzle assembly that is also downstream of the closed section valve.

SUMMARY OF THE INVENTION

Embodiments of the disclosure provide an adapter valve assembly configured to attach to a nozzle assembly and control fluid flow through the nozzle assembly, the adapter valve assembly comprising an adapter having an inner threaded surface, an outer surface, and a first plurality of connecting elements on the outer surface; a valve assembly having an inner surface, a valve, a valve body, and a second plurality of connecting elements on the inner surface; wherein the first plurality of connecting elements is configured to engage the second plurality of connecting elements when the adapter has been inserted into the valve body of the valve assembly.

Embodiments of the disclosure also provide a nozzle valve assembly for directing fluid from a boom pipe comprising a pipe clamp configured to engage the boom pipe; a nozzle assembly including at least one turret and at least one spray tip; a siphon tube; and an adapter valve assembly configured to attach to the nozzle assembly and control fluid flow through the nozzle assembly, the adapter valve assembly comprising an adapter having an inner threaded surface, an outer surface, and a first plurality of connecting elements on the outer surface; a valve assembly having an inner surface, a valve, a valve body, and a second plurality of connecting elements on the inner surface; wherein the first plurality of connecting elements is configured to engage the second plurality of connecting elements when the adapter has been inserted into the valve body of the valve assembly.

Embodiments of the disclosure further provide a method of installing an adapter valve assembly onto a nozzle assembly having an end cap, where the method comprises removing the end cap from a first location on the nozzle assembly, and installing an adapter valve assembly onto the first location, wherein the adapter valve assembly includes a ball valve.

These and other features, aspects, and advantages of the present invention will become better understood upon consideration of the following detailed description, drawings, and appended claims.

DETAILED DESCRIPTION

Figure 1:
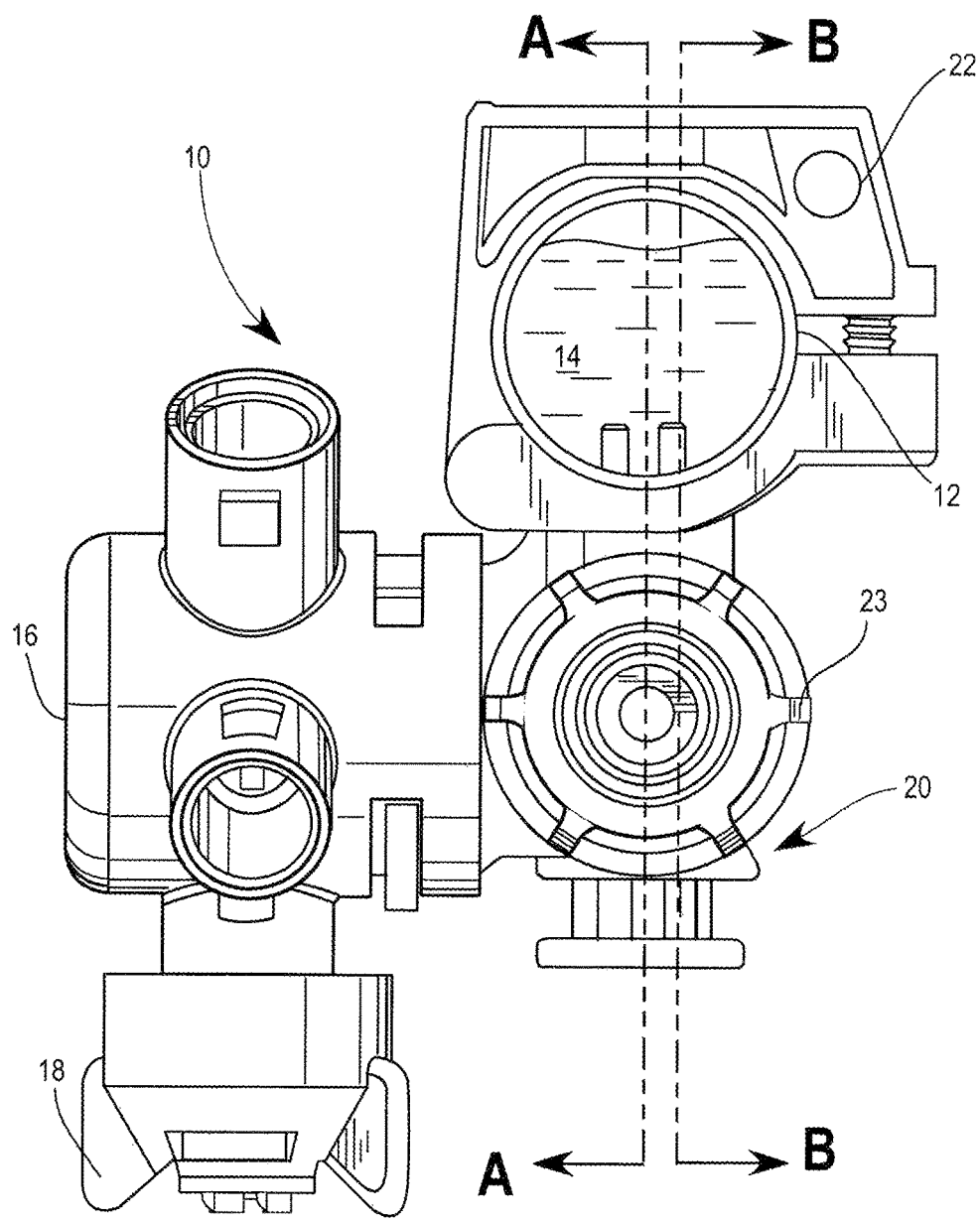
FIG. 1 is a front view of a nozzle assembly coupled to a wet boom pipe by a pipe clamp, indicated as prior art.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Embodiments of the disclosure provide an adapter 100 as an accessory to a valve assembly 110. The adapter 100 and valve assembly 110 can be combined to form an adapter valve assembly 200. The adapter valve assembly 200 can be configured to attach to an existing nozzle assembly 10 or a new nozzle assembly 140. The adapter valve assembly 200 allows a user to control fluid movement through each individual nozzle assembly 10, 140 that is distributed along a spray boom pipe 170. The user can control fluid movement through an individual nozzle assembly 10, 140 independent of the pressure within the system.

In one embodiment, the adapter valve assembly 200 includes a valve assembly 110 having an electrically-actuated ball valve 150 that can be controlled by a user. The valve assembly 110 can function independent of pressure or flow within a spray system and can be actuated as desired by a user to provide individual fluid flow control at each nozzle assembly 10, 140. By providing a dedicated ball valve 150 at each nozzle assembly 10, 140 along a spray boom pipe 170, a user can control fluid flow at each individual nozzle assembly 10, 140.

FIG. 1 shows a conventional nozzle assembly 10 coupled to a spray boom pipe 12. The spray boom pipe 12 can be an agricultural boom and can be used for delivering a fluid solution 14 (i.e., water and/or chemicals) to the nozzle assembly 10. The nozzle assembly 10 includes a turret 16, spray tips 18, a turret assembly 20, and an end cap 23. The pipe clamp 22 is configured to connect the nozzle assembly 10 to the spray boom pipe 12.

Figure 2:
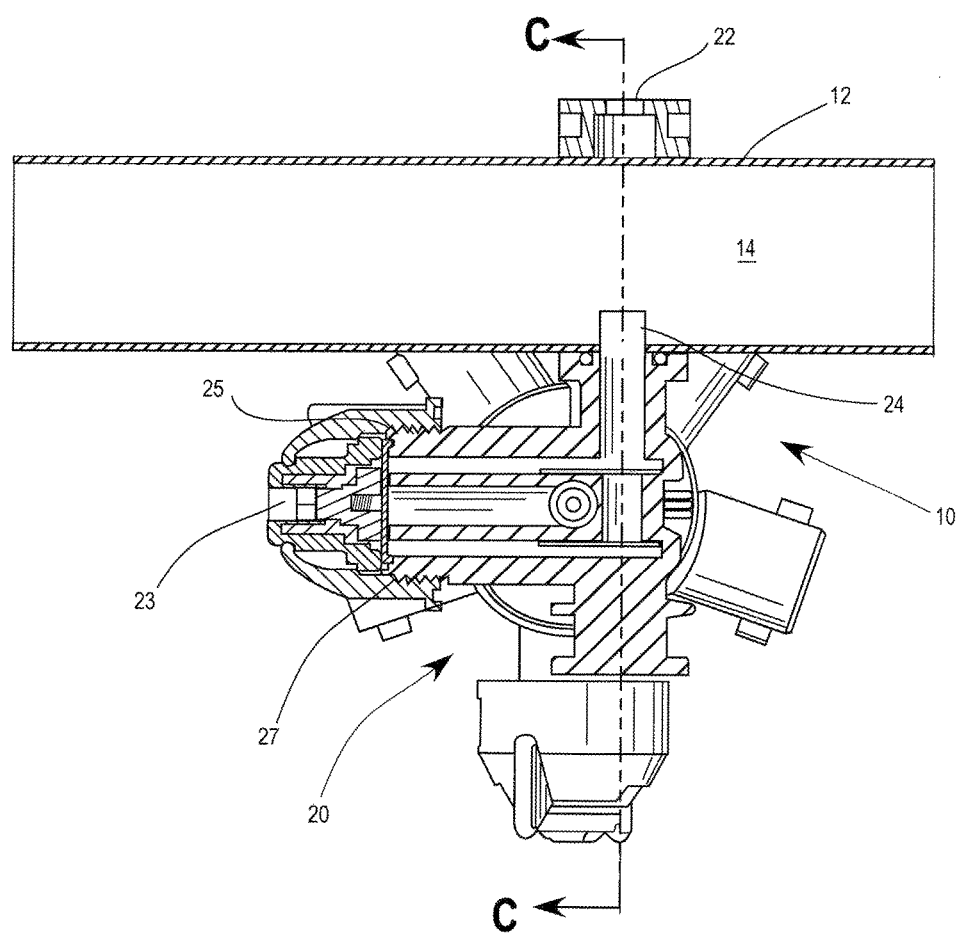
FIG. 2 is a cross sectional view of the nozzle assembly, wet boom pipe and pipe clamp of FIG. 1 taken along section line A-A, indicated as prior art.

FIG. 2 shows a siphon tube 24 extending through an opening in the spray boom pipe 12 which can transfer fluid 14 from the spray boom pipe 12 into the nozzle assembly 10. FIG. 2 also illustrates that the end cap 23 has internal threads 25 which interface and interlock with the external threads 27 of the nozzle assembly 10. External threads are present on many existing nozzle assemblies.

Figure 3:
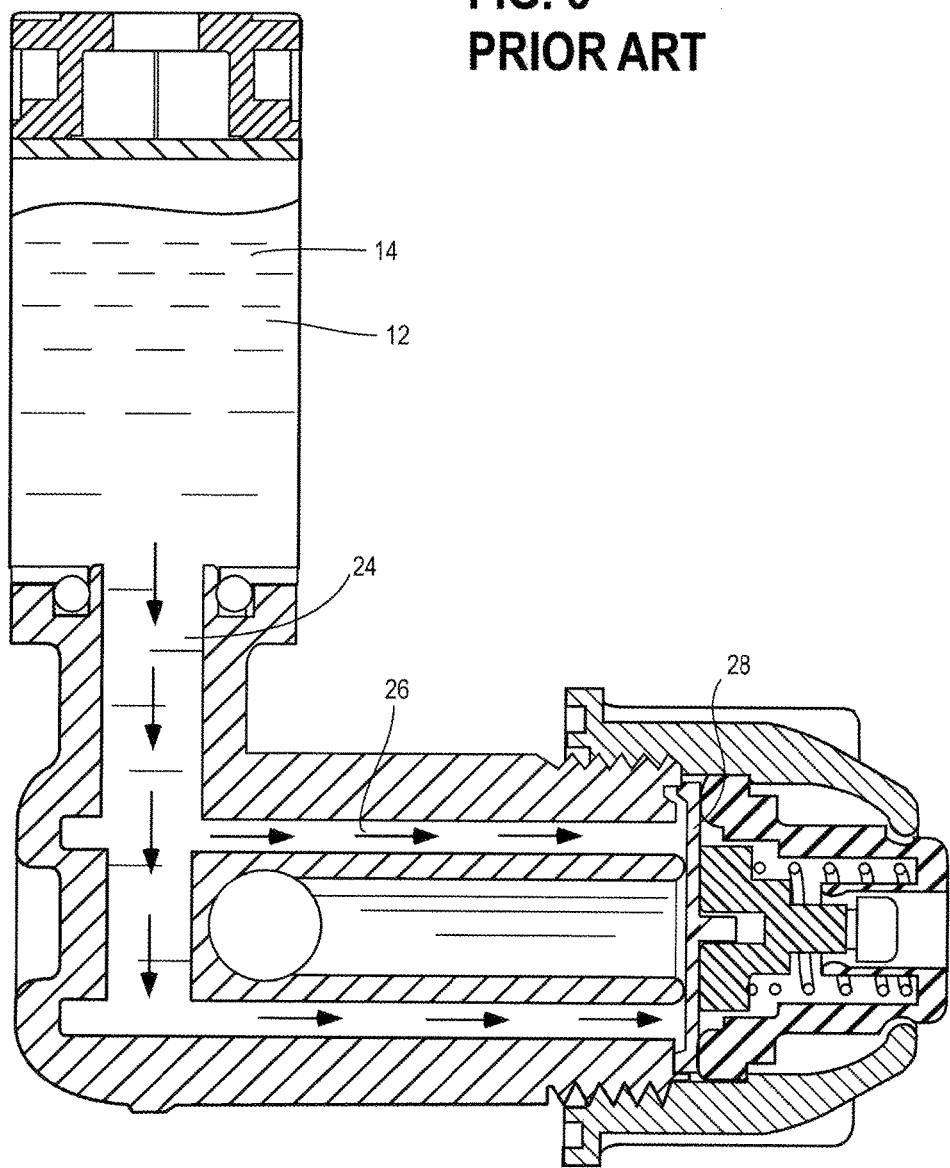
FIG. 3 is a cross sectional view of the nozzle assembly, wet boom pipe and pipe clamp of FIG. 1 taken along section line B-B, showing fluid flow through the wet boom pipe and nozzle assembly, indicated as prior art.
Figure 4:
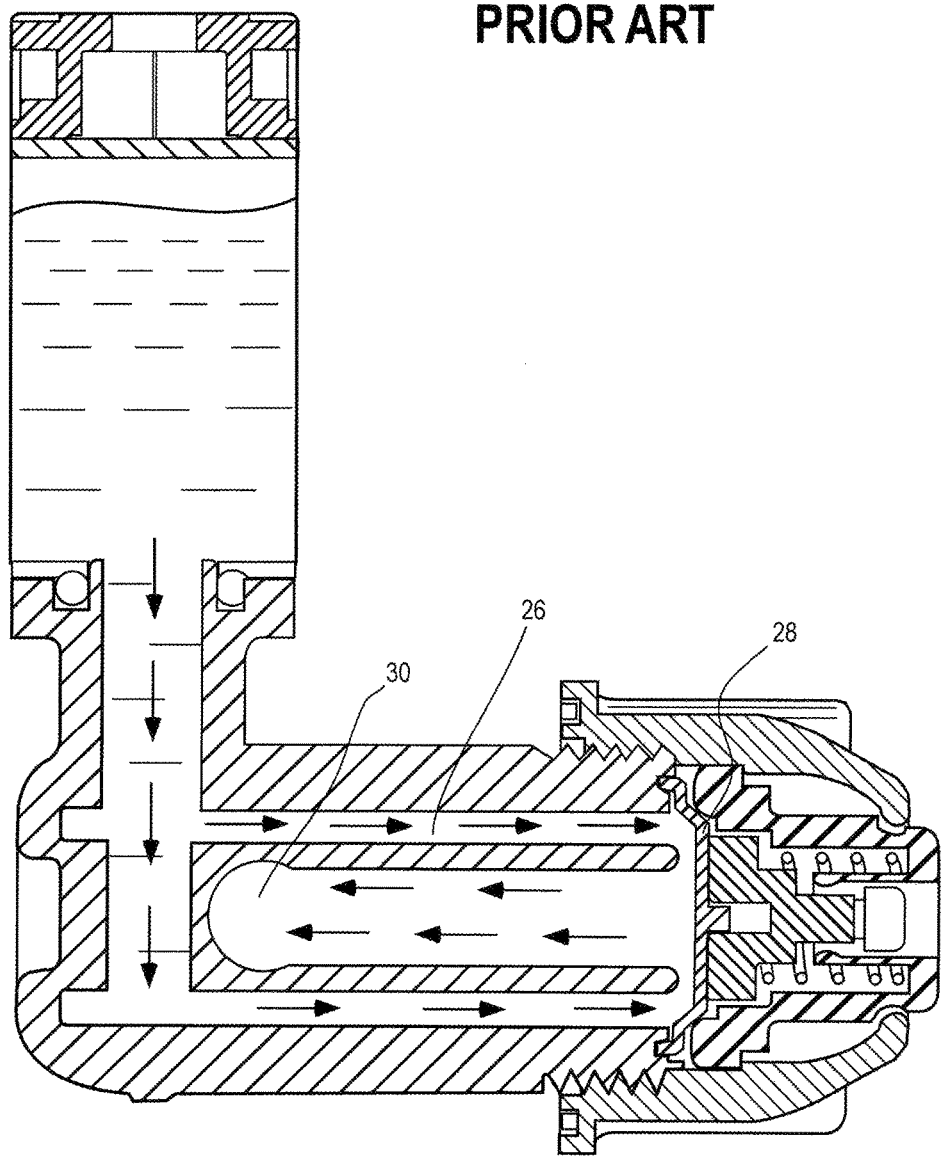
FIG. 4 is a cross sectional view of the nozzle assembly, wet boom pipe and pipe clamp of FIG. 1 taken along section line B-B, showing fluid flow through the wet boom pipe and nozzle assembly, indicated as prior art.
Figure 5:
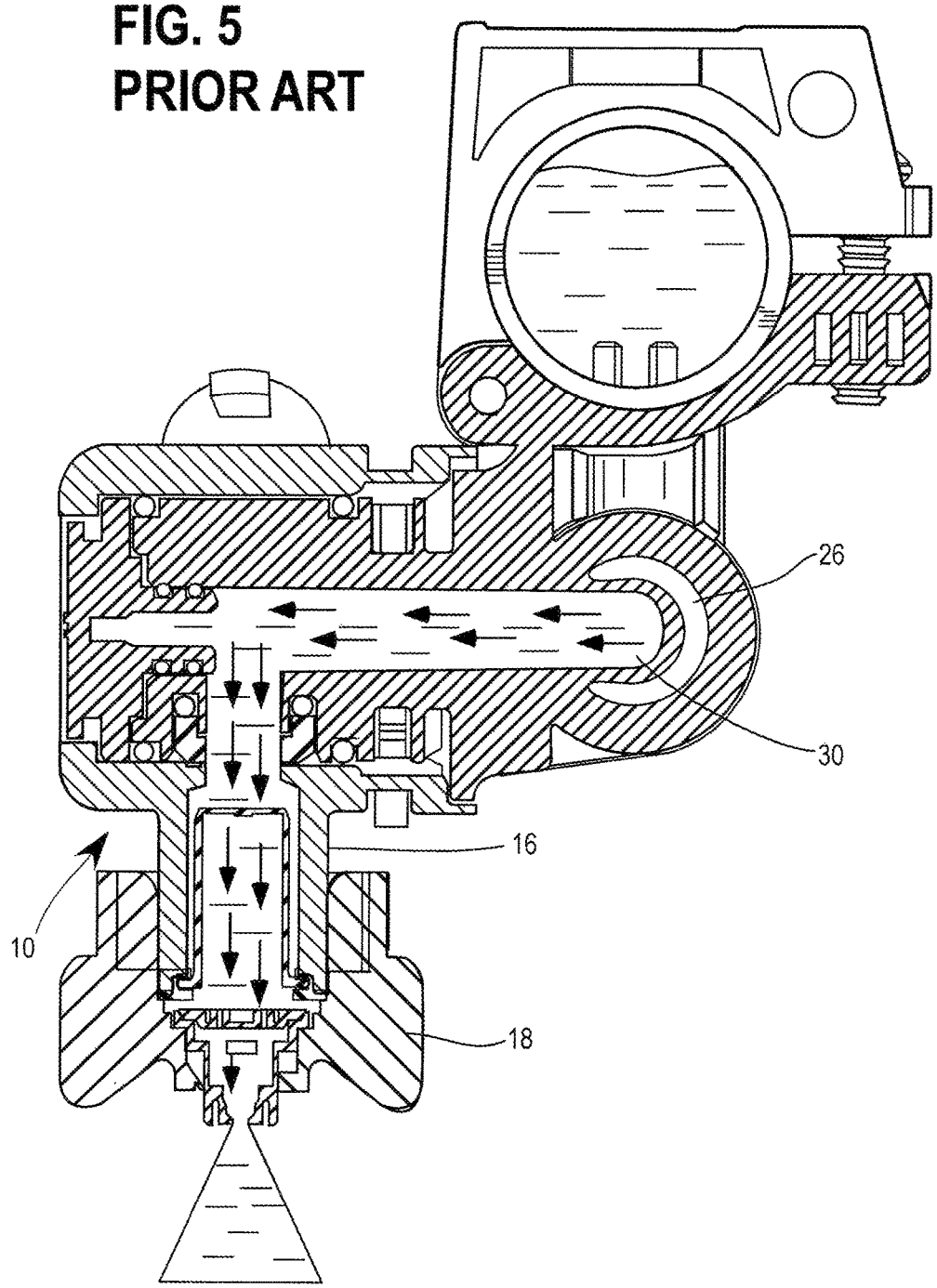
FIG. 5 is a cross sectional view of the nozzle assembly, wet boom pipe and pipe clamp of FIG. 2 taken along section line C-C, showing fluid flow through the wet boom pipe and nozzle assembly, indicated as prior art.

FIGS. 3-5 show a fluid flow diagram through a conventional nozzle assembly 10. These figures illustrate how fluid 14 flows from the spray boom pipe 12 through a valve assembly 20 and exits out the turret 16 and spray tips 18. FIG. 3 illustrates how fluid 14 is sent by a solution system (not shown) to the spray boom pipe 12. Some of the fluid 14 will flow to the siphon tube 24 and toward the turret assembly 20. The fluid 14 initially flows through outer pipe 26 toward a valve such as a diaphragm check valve 28. As shown in FIG. 4, as the fluid 14 continues to flow, it builds up pressure against the diaphragm check valve 28, which eventually causes the diaphragm check valve 28 to open when a preset pressure limit is reached. FIG. 4 illustrates the diaphragm check valve 28 in an open state. Once the diaphragm check valve 28 has opened, fluid 14 can now flow through inner pipe 30 which is circumscribed by outer pipe 26. FIG. 5 illustrates the fluid path once the fluid 14 has made a turn and has begun flowing toward the turret 16 and eventually out through the spray tips 18.

Figure 6:
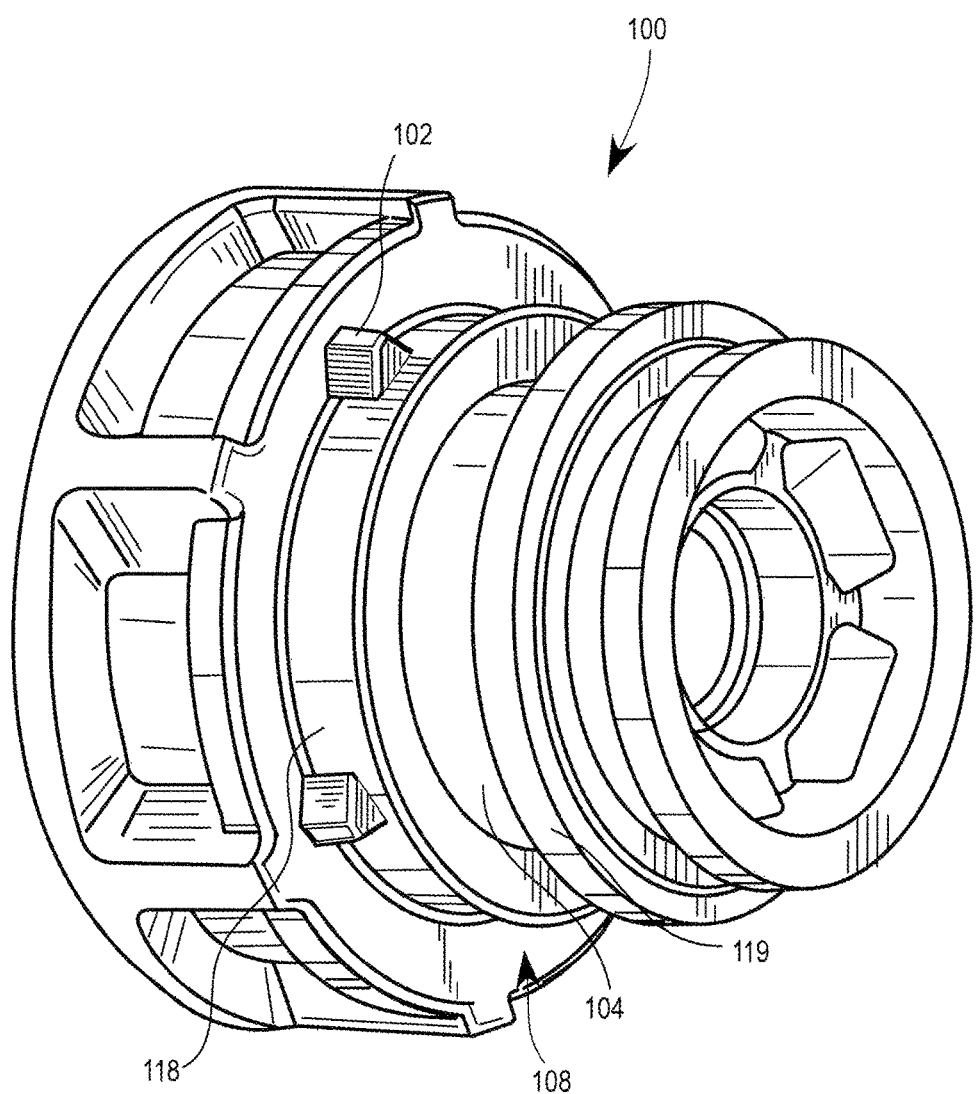
FIG. 6 is a perspective view of an adapter according to one embodiment of the disclosure.
Figure 8:
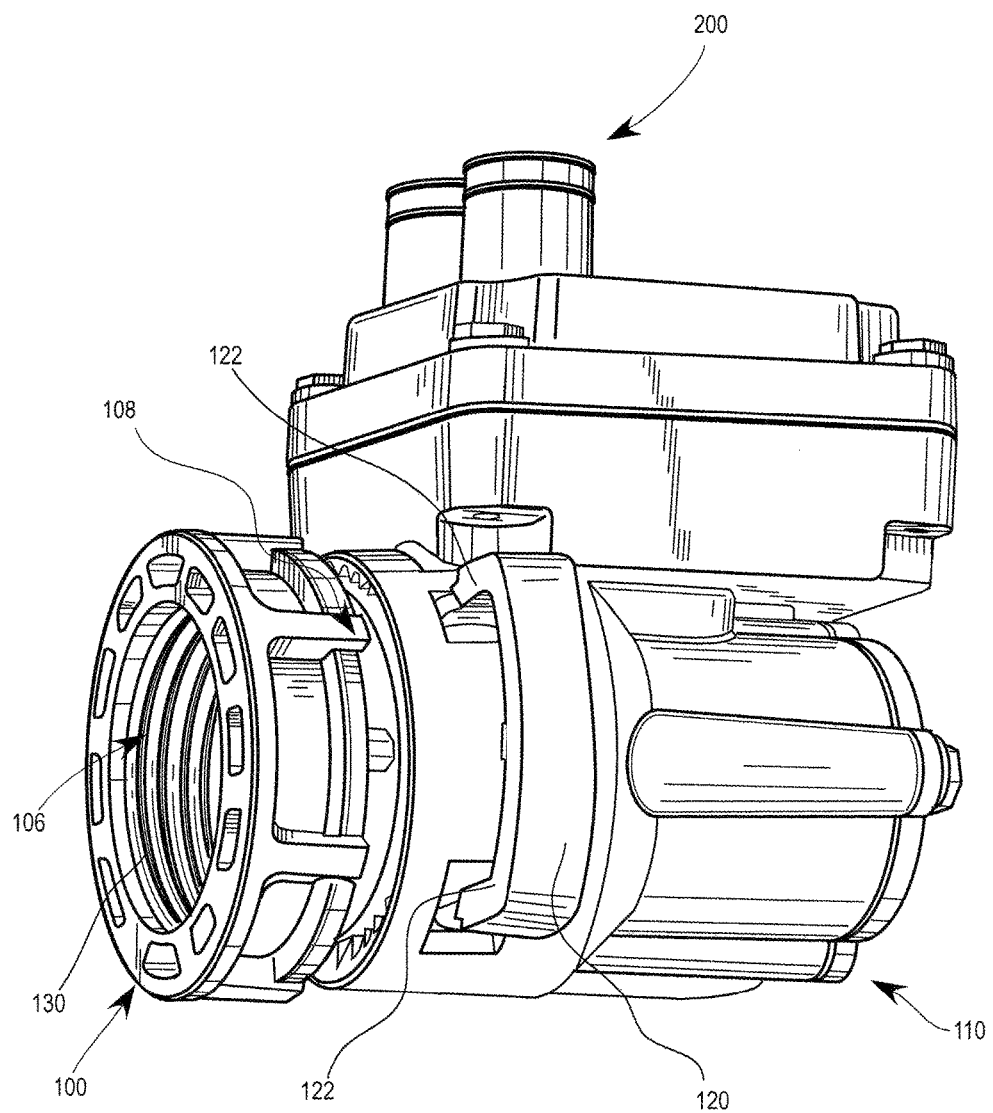
FIG. 8 is a perspective view showing the adapter of FIG. 6 inserted into the valve assembly of FIG. 7 and coupled to the valve assembly via a fastener, to form an adapter valve assembly according to one embodiment of the disclosure.

FIG. 6 illustrates one embodiment of an adapter 100 having an inner surface 106 (not shown), an outer surface 108, and a connecting element for connecting to a valve assembly 110. As shown in FIG. 8, the inner surface 106 of the adapter 100 is threaded to allow the adapter 100 to connect to other threaded surfaces such as the threaded outer surface of a nozzle assembly 10, 140. As shown in FIG. 6, the connecting element for the adapter 100 can include one or more teeth 102 located on an outer surface of the adapter 100. While teeth 102 can be used as a connecting element, it will be understood to one of ordinary skill in the art that various other means of attachment would be suitable. The teeth 102 are configured to engage with connecting elements on the valve assembly 110. The adapter 100 can also include a depressed surface 104 and retaining walls 118, 119 to aid in preventing axial movement of the adapter 100. In one embodiment, as shown in FIG. 6, the retaining walls 118, 119 are elevated in a radial direction around the circumference of the adapter 100.

Figure 7:
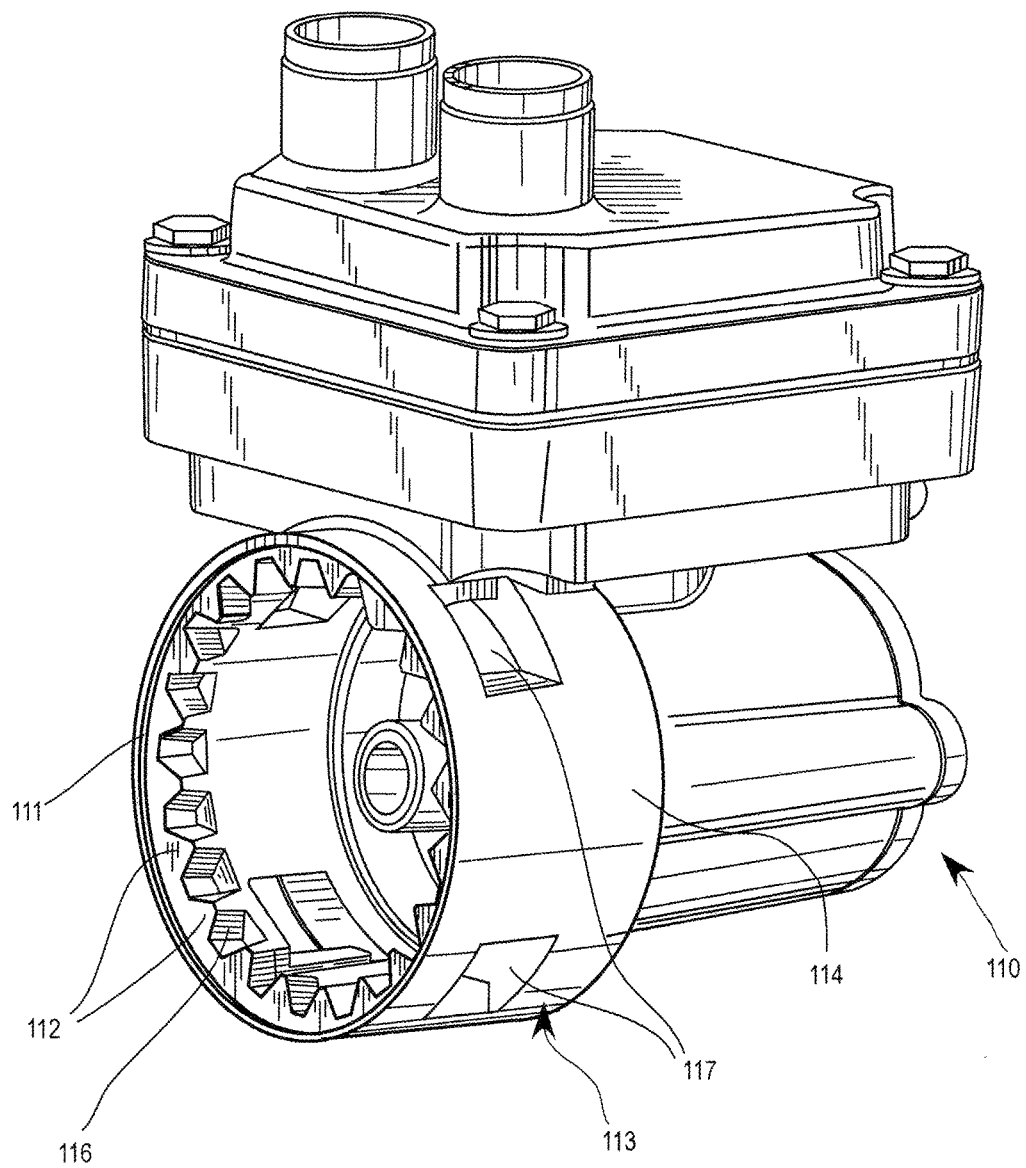
FIG. 7 is a perspective view of a valve assembly according to one embodiment of the disclosure.

FIG. 7 illustrates one embodiment of the valve assembly 110 having an inner surface 111, an outer surface 113, a valve body 114, and at least one opening 117. The valve assembly 110 can also include a connecting element for connecting to the adapter 100. The connecting element can be located on an inner surface 111 of the valve assembly 110 and can be sized to interface with the connecting element on the adapter 100. In one embodiment, as shown in FIG. 7, the connecting element for the valve assembly 110 can include one or more teeth 112 located radially around the inner surface 111 of the valve assembly 110. While teeth 112 can be used as a connecting element, it will be understood to one of ordinary skill in the art that various other means of attachment would be suitable. The spaces or voids between the teeth 112 form female recesses 116 which can be sized to receive the teeth 102 from the adapter 100 at various positions.

The teeth 102, 112 of the adapter 100 and valve assembly 110 cooperate to hold the body 114 of the valve assembly 110 and help keep the body 114 from rotating. However, the multitude of teeth 102, 112 and recesses 116 also allow the rotational relationship of the adapter 100 and valve assembly 110 to be adjusted. Although this first embodiment discloses coupling the adapter 100 to the valve assembly 110 via teeth 102, 112, those of ordinary skill in the art will recognize many alternative ways to couple the adapter 100 and valve assembly 110, such as a lip and groove or other suitable connection.

Figure 9:
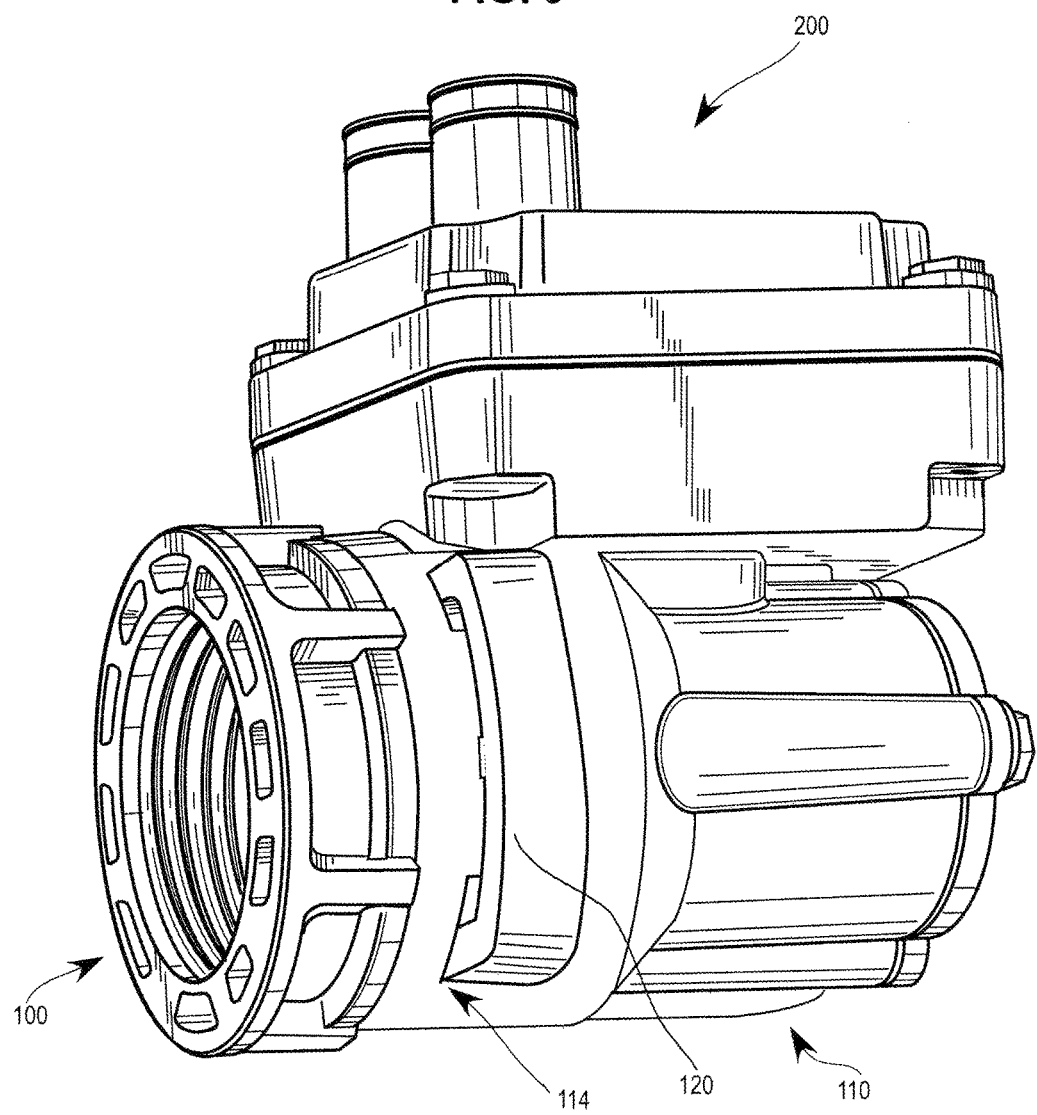
FIG. 9 is a perspective view of the adapter valve assembly of FIG. 8 with the fastener depressed further into the valve assembly.

In one embodiment, the adapter 100 and valve assembly 110 can also be coupled in a manner that helps prevent them from moving in an axial direction, relative to one another. A fastener can be used to affix the adapter 100 to the valve assembly 110. The fastener can be a clip 120 which engages with one or more openings 117 located on the outer surface of the body 114. In one embodiment, the clip 120 can include one or more arms 122 which can engage the one or more openings 117 on the body 114. The arms 122 can be coupled to the depressed surface 104 on the adapter 100. As shown in FIGS. 8 and 9, when the adapter 100 is fully inserted into the valve assembly 110 and the external clip 120 is inserted into the plurality of openings 114 and fully depressed against surface 104; this coupling can hold the adapter 100 against the valve assembly 110 and help prevent significant displacement in the axial direction.

The clip 120 can also later be removed from the surface 104 such that it is no longer held in place between first 118 and second 119 retaining walls. This allows for axial movement of the adapter 100 relative to the body 114. In one embodiment, when the clip 120 is no longer held in place between the first 118 and second 119 retaining walls, the body 114 can be freely rotated about the adapter 100 to allow for a change in their respective orientations. When the desired position is reached, the clip 120 can be fully depressed back into the valve assembly 110, locking the body 114 into its current orientation. In an alternative embodiment, the clip 120 can have a lip or other retaining surface which prevents the assembly 110 from being able to be completely disassembled. Further, because the clip 120 is locked into the one or more openings 117, this helps prevents the clip 120 from being lost. Although this first embodiment discloses engaging the adapter 100 to the valve assembly 110 via a clip 120, those of ordinary skill in the art will recognize other suitable forms of engagement.

Figure 10:
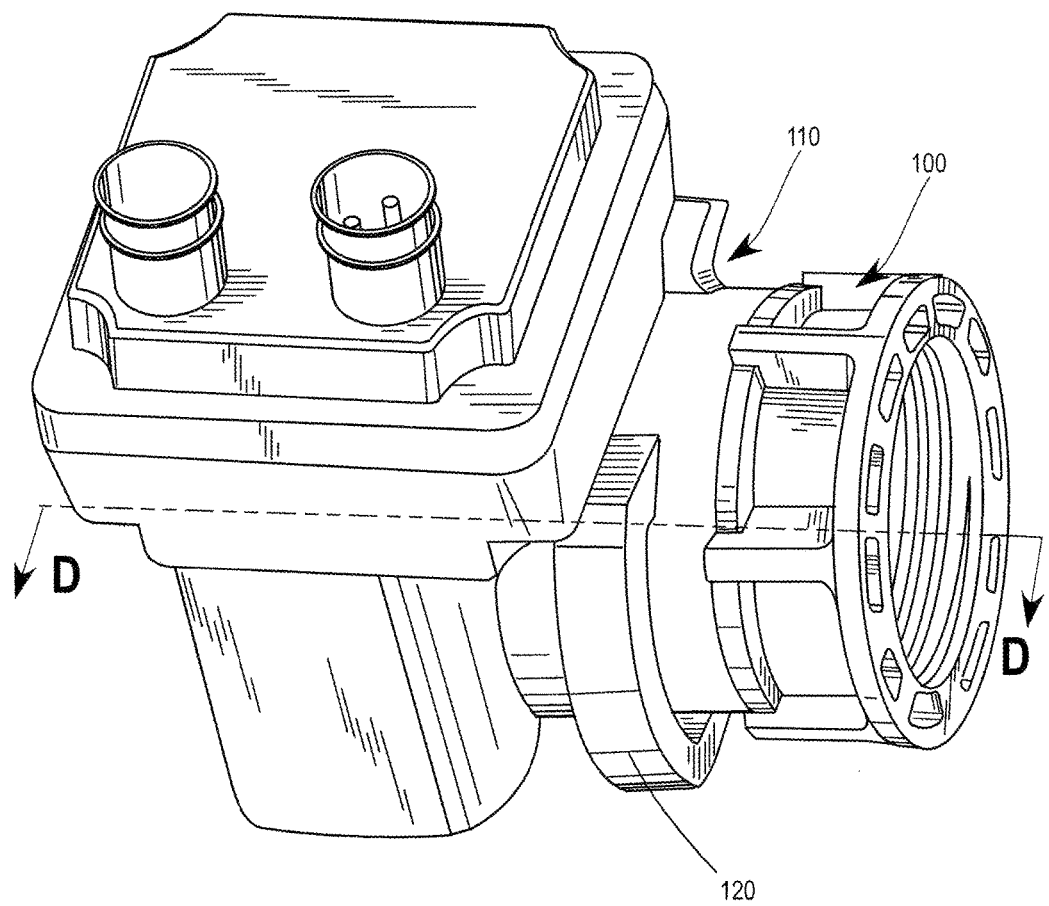
FIG. 10 is a top perspective view of the adapter valve assembly of FIG. 9.
Figure 11:
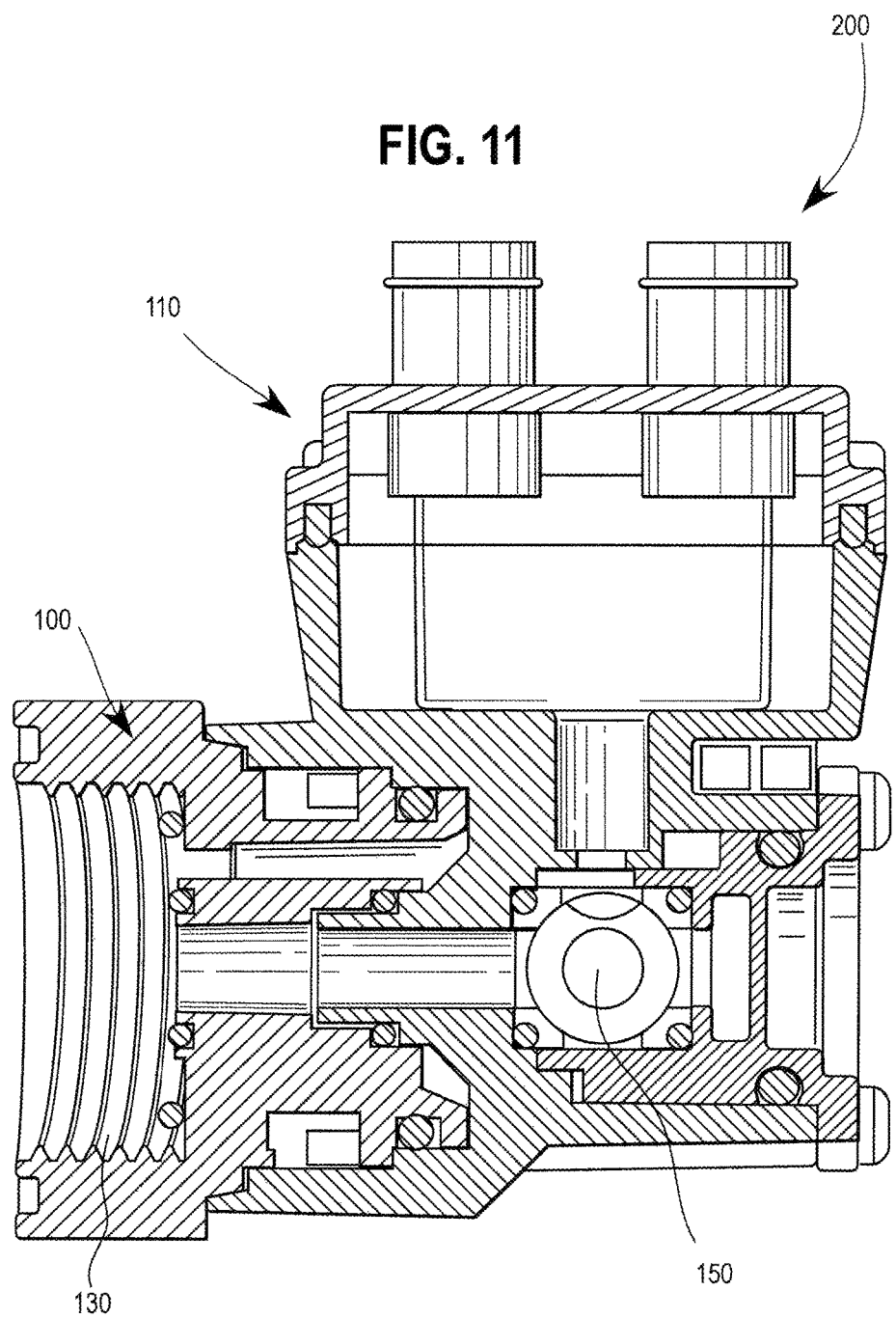
FIG. 11 is a cross sectional view of the adapter valve assembly of FIG. 10, taken along section line D-D.

FIG. 10 illustrates an alternative view of an adapter valve assembly 200 where the clip 120 is coupling the adapter 100 to the valve assembly 110. FIG. 11 illustrates a cross sectional view of the adapter valve assembly 200 taken along section line D-D of FIG. 10. In one embodiment, the adapter 100 can be coupled to a valve assembly 110 via various types of couplings such as a threaded connection. The threads 130 are located on an inner surface 106 of adapter 100.

In one embodiment, as shown in FIG. 8, the inner surface 106 of the adapter 100 is cylindrical. In another embodiment, the outer surface 108 of the adapter 100 is cylindrical with depressions on the outer surface 108. The depressions can each be sized to accept a fastener such as a clip. The depressions on the outer surface 108 of the adapter 100 can form retaining walls which extend out in the radial direction around the circumference of the adapter 100. Existing nozzle assemblies 10 and new nozzle assemblies 140 can have external threads already present which can be used for coupling with the threads 130 of the adapter 100. Thus, the adapter 100 and adapter valve assembly 200 can be configured to be an accessory to both existing 10 and new nozzle assemblies 140.

Figure 12:
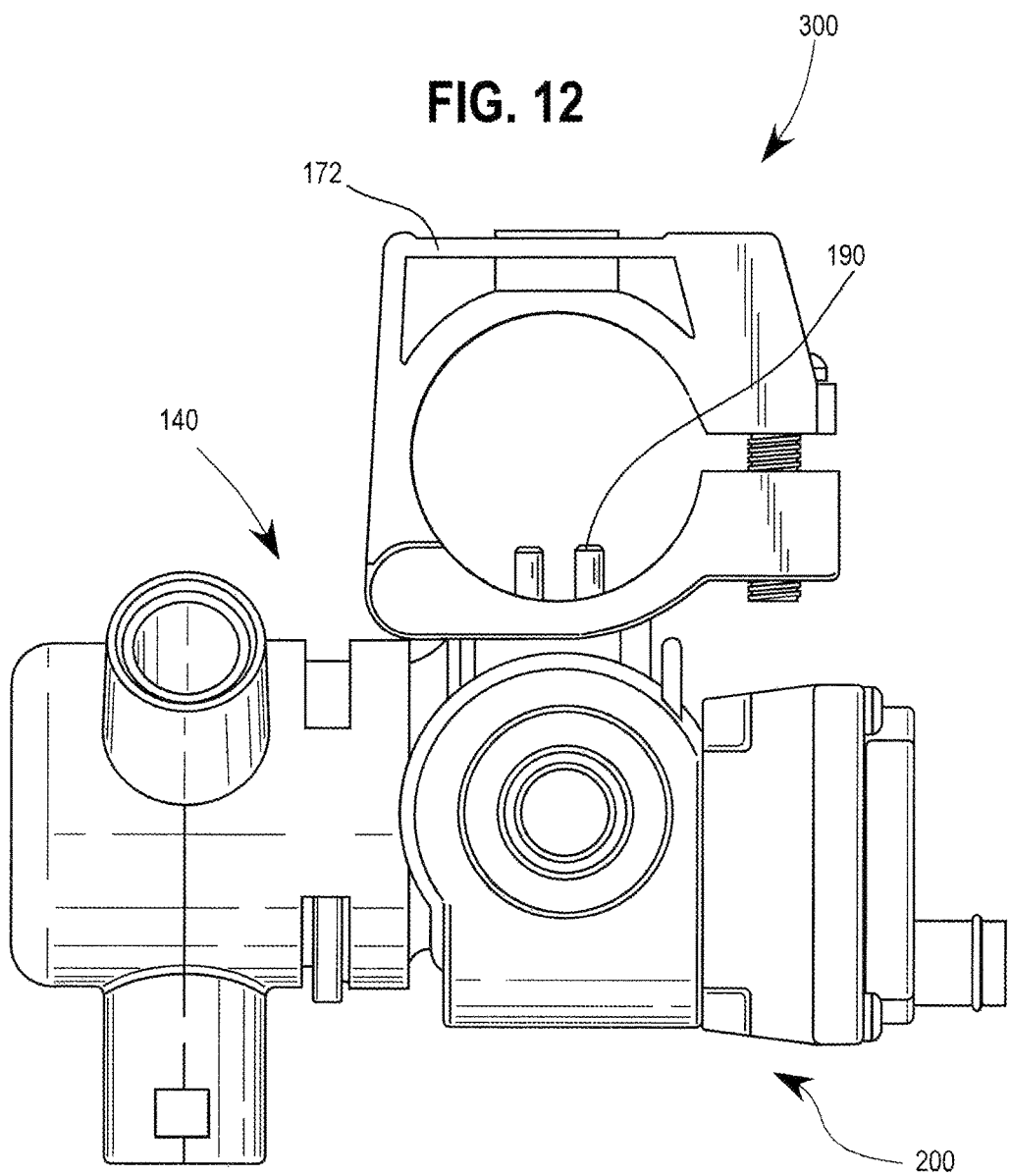
FIG. 12 is a front view of a nozzle valve assembly and pipe clamp, according to one embodiment of the disclosure.
Figure 13:
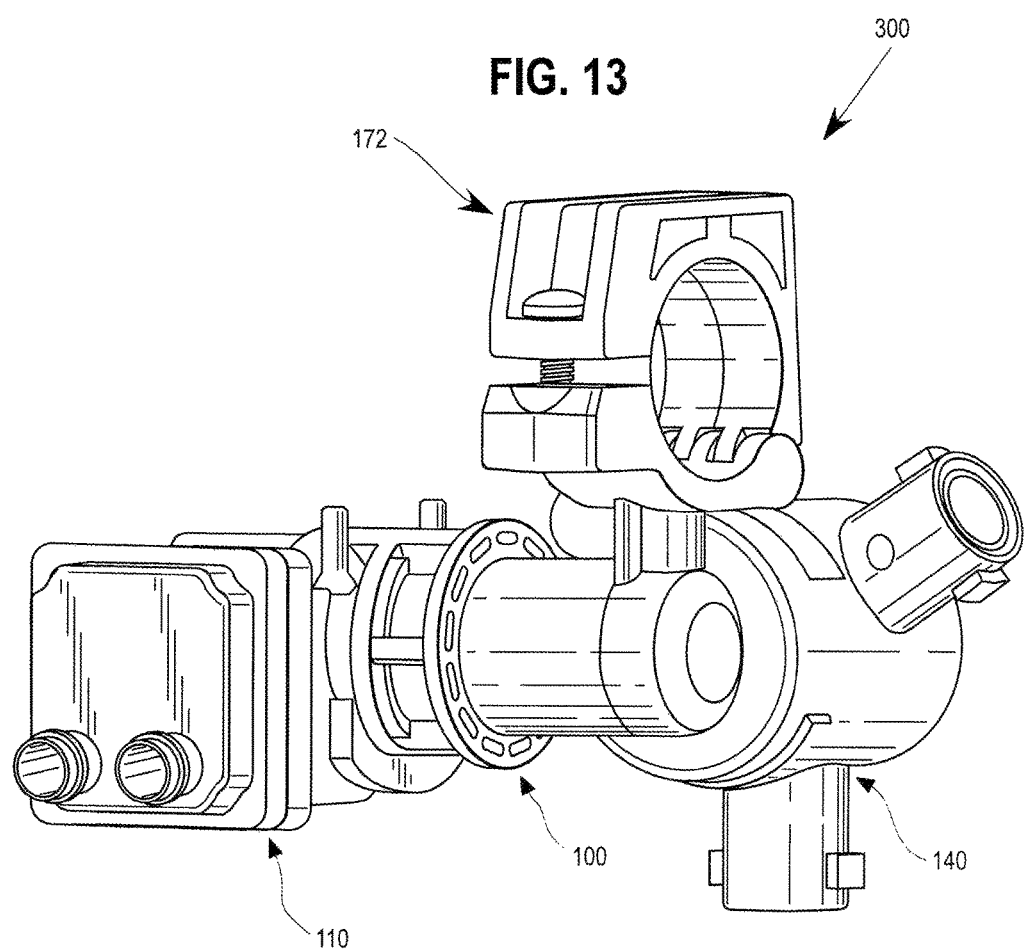
FIG. 13 is a rear perspective view of the nozzle valve assembly and pipe clamp of FIG. 12.
Figure 14:
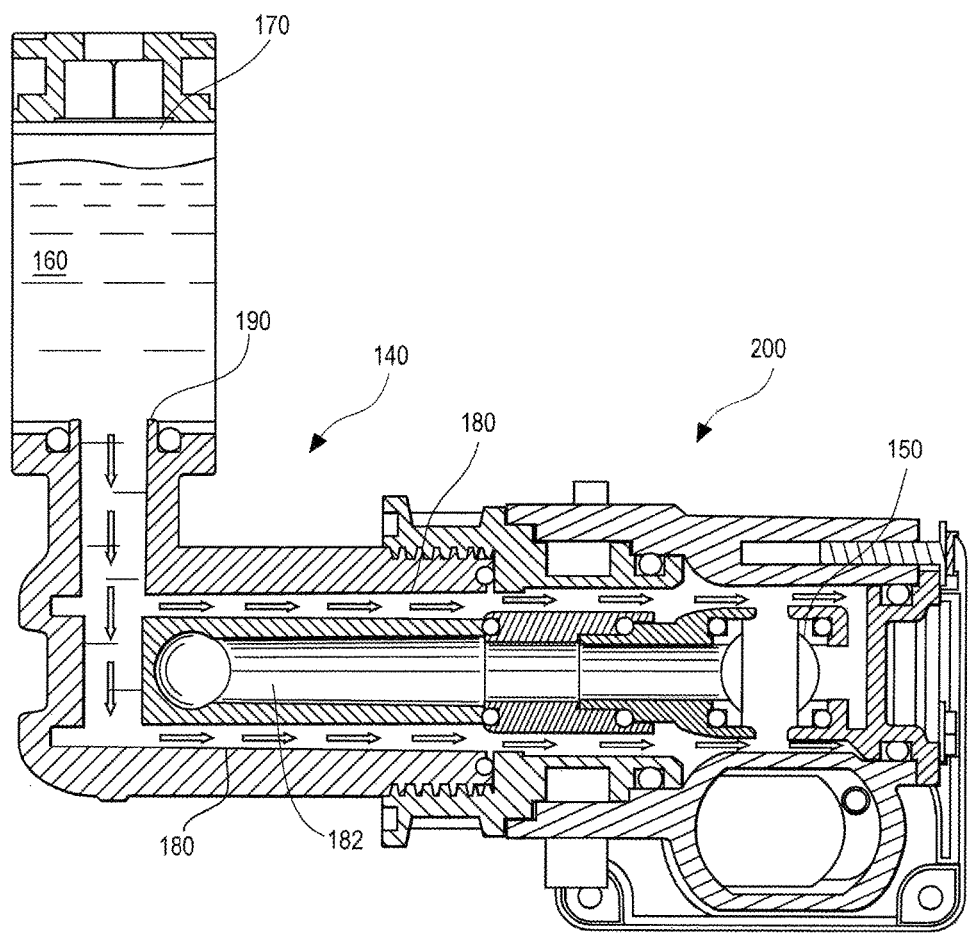
FIG. 14 is a cross sectional view of the ball valve of a nozzle valve assembly, when the ball valve is in a closed position.

FIGS. 12 and 13 illustrate a nozzle valve assembly 300 which includes a pipe clamp 172 configured to connect to a boom pipe 170 (as shown in FIG. 14), an adapter valve assembly 200 coupled to a nozzle assembly 140, and a siphon tube 190. In one embodiment, the adapter valve assembly 200 can be coupled to the nozzle assembly 140 by using a threaded connection. The nozzle assembly 10, 140 can be a new component or an existing component already installed in the field. The adapter 100 of this disclosure includes internal threads 130 so that it can interface with existing external threads on nozzle assemblies 10 currently installed in the field. This allows existing nozzle assemblies 10 to be adapted for use with the electrically actuated valve assembly 110 of the present disclosure. By retrofitting the existing nozzle assemblies 10 with an adapter valve assembly 200, a user can control fluid flow at each individual nozzle assembly 10.

In order to retrofit an existing nozzle assembly 10 for use with the adapter valve assembly 200 of the present disclosure, a user unthreads and removes the end cap 23 from the nozzle assembly 10. The user then threads and installs an adapter valve assembly 200 onto the location where the end cap 23 was removed. In one embodiment, the adapter valve assembly 200 includes an electrically actuated ball-valve and therefore will require electrical connections to be connected to the adapter valve assembly. Since the adapter valve assembly 200 can be used in a retrofit application, it can be streamlined for ease of use to filed installers and end users. In one embodiment, the electrical connections are positioned so that they can be adjusted without affecting the function of the adapter valve assembly 200. Further, a user can also adjust the orientation between the adapter 100 and valve assembly 110.

Figure 15:
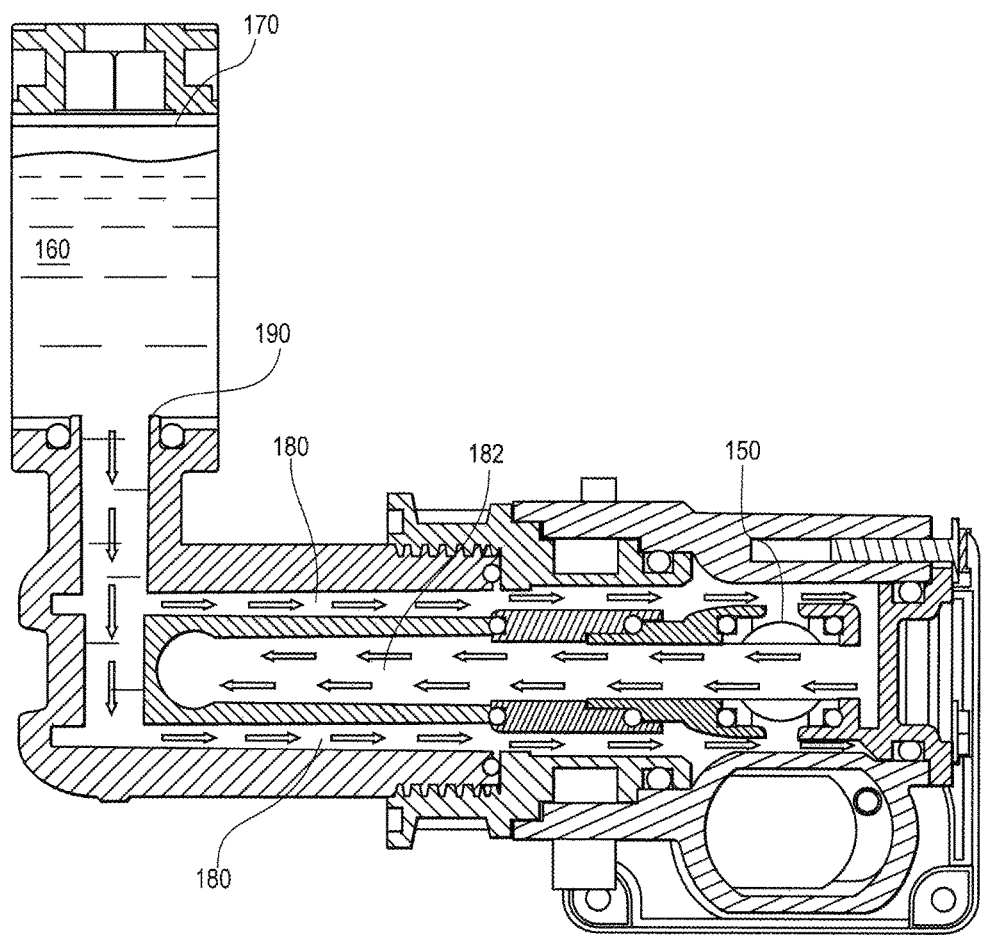
FIG. 15 is a cross sectional view of the ball valve of a nozzle valve assembly, when the ball valve is in an open position.
Figure 16:
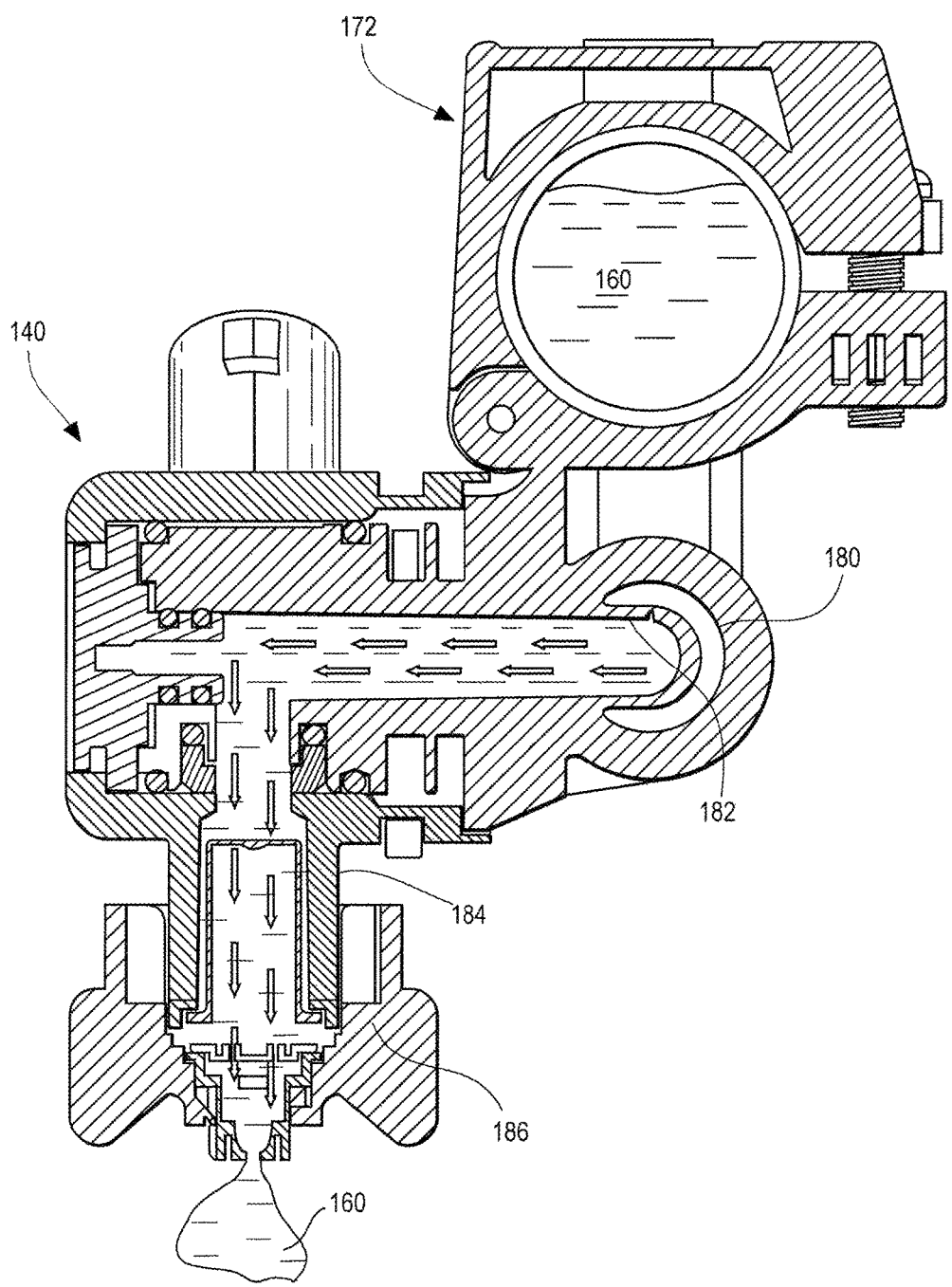
FIG. 16 is a cross sectional view of a nozzle valve assembly, showing fluid flow from a wet boom pipe, through the nozzle valve assembly, and exiting out of a spray tip.

FIGS. 14-16 illustrate how fluid 160 flows from the boom pipe 170 through an outer pipe 180 and toward the adapter valve assembly 200. The adapter valve assembly 200 includes a valve 150 that controls movement of the fluid 160 through a nozzle assembly 140 and valve assembly 200. In one embodiment, the valve 150 can be set to fully open, partially open, partially closed or fully closed. In one embodiment, the valve assembly 200 includes a ball valve 150 that can be actuated by an electrical signal to change its position. The ball valve 150 can have a single inlet and outlet port or have multiple inlet and outlet ports. The valve assembly 200 can function independent of the pressure or flow within the system and can be actuated as desired by the user. The system is no longer dependent upon pressure as is the case for the conventional nozzle assembly 10 of FIGS. 1-5.

In FIG. 14, in one embodiment, the fluid 160 flows from boom pipe 170 down siphon tube 190 and through outer pipe 180. The ball valve 150 in FIG. 14 is shown in a "closed" state and therefore the valve 150 is not allowing the fluid 160 to flow into an inner pipe 182.

In FIG. 15, the ball valve 150 is now shown in an "open state" which allows the fluid 160 to flow into inner pipe 182, which is circumscribed by outer pipe 180. The ball valve 150 can be actuated into the "open" or "closed" state at any time when desired by a user. The user can do so by causing an electrical signal to be sent to the ball valve 150. FIG. 16 illustrates the fluid path when the ball valve 150 is in an "open" position and further illustrates the fluid flow path once the fluid 160 alters direction and begins flowing toward the turret 184 and the spray tips 186. In this "open" ball valve state, the fluid 160 can continue to flow through the ball valve 150 and exit out the turret 184 and the spray tips 186. An electrical signal can also direct the ball valve 150 to actuate into the "off" or "closed" position which causes the ball valve 150 to close and shut off the flow of fluid 160 through the nozzle assembly 140.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

The invention claimed is:

1. An adapter valve assembly configured to attach to a nozzle assembly and control fluid flow through the nozzle assembly, the adapter valve assembly comprising:
    an adapter having an inner threaded surface, an outer surface, and a first plurality of connecting elements on the outer surface;
    a valve assembly having an inner surface, a valve, a valve body, and a second plurality of connecting elements on the inner surface;
    wherein the first plurality of connecting elements is configured to engage the second plurality of connecting elements to hold the valve body from rotating relative to the adapter when the adapter has been inserted into the valve body of the valve assembly.

2. The adapter valve assembly of claim 1 wherein the first plurality of connecting elements and the second plurality of connecting elements each include teeth.

3. The adapter valve assembly of claim 1 wherein the outer surface of the adapter further comprises a depressed surface, a first retaining wall, and a second retaining wall, wherein the first retaining wall and second retaining wall are elevated in a radial direction around the circumference of the adapter.

4. The adapter valve assembly of claim 1 wherein the valve body further comprises at least one opening configured to accept a fastener.

5. The adapter valve assembly of claim 4 further comprising a fastener configured to couple the adapter to the valve assembly through the at least one opening.

6. The adapter valve assembly of claim 5 wherein the fastener is a clip having at least one arm configured to enter the at least one opening and interface with a depressed surface of the adapter.

7. The adapter valve assembly of claim 1 wherein the valve is a ball valve having at least one inlet port and at least one outlet port.

8. The adapter valve assembly of claim 1 wherein the valve can be actuated by an electrical signal to change a position of the valve.

9. The adapter valve assembly of claim 1 wherein the valve has a single inlet port and a single outlet port.

10. The adapter valve assembly of claim 1 wherein the valve has a plurality of inlet ports and a plurality of outlet ports.

11. A nozzle valve assembly for directing fluid from a boom pipe comprising:
    a pipe clamp configured to engage the boom pipe;
    a nozzle assembly including at least one turret and at least one spray tip;
    a siphon tube; and
    an adapter valve assembly configured to attach to the nozzle assembly and control fluid flow through the nozzle assembly, the adapter valve assembly comprising:
        an adapter having an inner threaded surface, an outer surface, and a first plurality of connecting elements on the outer surface;
        a valve assembly having an inner surface, a valve, a valve body, and a second plurality of connecting elements on the inner surface;
        wherein the first plurality of connecting elements is configured to engage the second plurality of connecting elements when the adapter has been inserted into the valve body of the valve assembly to keep the valve body from rotating relative to the adapter.

12. The nozzle valve assembly of claim 11 wherein the outer surface of the adapter further comprises a depressed surface, a first retaining wall and a second retaining wall wherein the first retaining wall and second retaining wall are elevated in a radial direction around the circumference of the adapter.

13. The nozzle valve assembly of claim 12 further comprising a clip having at least one arm configured to enter at least one opening in the valve body and interface with the depressed surface of the adapter.

14. The nozzle valve assembly of claim 11 wherein the valve is a ball valve which can be actuated by an electrical signal to change a position of the ball valve.

15. The nozzle valve assembly of claim 14 wherein the ball valve has a single inlet port and a single outlet port.

16. The nozzle valve assembly of claim 14 wherein the ball valve has a plurality of inlet ports and a plurality of outlet ports.

17. A method of installing an adapter valve assembly onto a nozzle assembly having an end cap, they method comprising:
    removing the end cap from a first location on the nozzle assembly; and
    installing an adapter valve assembly onto the first location, wherein the adapter valve assembly includes:
        an adapter having an inner threaded surface, an outer surface, and a first plurality of connecting elements on the outer surface;
        a valve assembly having an inner surface, a valve, a valve body, and a second plurality of connecting elements on the inner surface;
        wherein the first plurality of connecting elements is configured to engage the second plurality of connecting elements to inhibit the valve body from rotating relative to the adapter when the adapter has been inserted into the valve body of the valve assembly.

18. An adapter valve assembly configured to attach to a nozzle assembly and control fluid flow through the nozzle assembly, the adapter valve assembly comprising:
    an adapter having an inner threaded surface, an outer surface, and a first plurality of connecting elements on the outer surface;
    a valve assembly having an inner surface, a valve, a valve body, and a second plurality of connecting elements on the inner surface;
    wherein the first plurality of connecting elements is configured to engage the second plurality of connecting elements to inhibit the valve body from rotating relative to the adapter when the adapter has been inserted into the valve body of the valve assembly.

19. An adapter valve assembly configured to attach to a nozzle assembly and control fluid flow through the nozzle assembly, the adapter valve assembly comprising:
    an adapter having an inner threaded surface, an outer surface, and a first plurality of connecting elements on the outer surface;
    a valve assembly having an inner surface, a valve, a valve body, and a second plurality of connecting elements on the inner surface;
    wherein the first plurality of connecting elements is configured to engage the second plurality of connecting elements when the adapter has been inserted into the valve body of the valve assembly; and wherein the outer surface of the adapter further comprises a depressed surface, a first retaining wall, and a second retaining wall, wherein the first retaining wall and second retaining wall are elevated in a radial direction around the circumference of the adapter.

20. An adapter valve assembly configured to attach to a nozzle assembly and control fluid flow through they nozzle assembly, the adapter valve assembly comprising:
   an adapter having an inner threaded surface, an outer surface, and a first plurality of connecting elements on the outer surface;
   a valve assembly having an inner surface, a valve, a valve body, and a second plurality of connecting elements on the inner surface;
   wherein the first plurality of connecting elements is configured to engage the second plurality of connecting elements when the adapter has been inserted into the valve body of the valve assembly; and
   wherein the valve body further comprises at least one opening configured to accept a fastener.

21. The adapter valve assembly of claim 20 further comprising a fastener configured to couple the adapter to the valve assembly through the at least one opening.

22. The adapter valve assembly of claim 21 wherein the fastener is a clip having at least one arm configured to enter the at least one opening and interface with a depressed surface of the adapter.

23. A nozzle valve assembly for directing fluid from a boom pipe comprising:
   a pipe clamp configured to engage the boom pipe;
   a nozzle assembly including at least one turret and at least one spray tip;
   a siphon tube; and
   an adapter valve assembly configured to attach to the nozzle assembly and control fluid flow through the nozzle assembly, the adapter valve assembly comprising:
      an adapter having an inner threaded surface, an outer surface, and a first plurality of connecting elements on the outer surface;
      a valve assembly having an inner surface, a valve, a valve body, and a second plurality of connecting elements on the inner surface;
      wherein the first plurality of connecting elements is configured to engage the second plurality of connecting elements when the adapter has been inserted into the valve body of the valve assembly;
   wherein the outer surface of the adapter further comprises a depressed surface, a first retaining wall and a second retaining wall wherein the first retaining wall and second retaining wall are elevated in a radial direction around the circumference of the adapter.

24. The nozzle valve assembly of claim 23 further comprising a clip having at least one arm configured to enter at least one opening in the valve body and interface with the depressed surface of the adapter.

\* \* \* \* \*